United States Patent [19]

Gokee

[11] Patent Number: 4,986,399
[45] Date of Patent: Jan. 22, 1991

[54] SHIFTER BRAKE INTERLOCK SYSTEM

[75] Inventor: Doanld J. Gokee, Bowling Green, Ohio

[73] Assignee: Babcock Industries, Inc., Fairfield, Conn.

[21] Appl. No.: 339,401

[22] Filed: Apr. 17, 1989

[51] Int. Cl.$^5$ .............................................. B60K 41/26
[52] U.S. Cl. ................................. 192/4 A; 74/483 K; 180/271
[58] Field of Search ............ 192/4 A, 4 C; 74/483 K, 74/483 R, 502.4, 502.6; 180/271, 336

[56] References Cited

U.S. PATENT DOCUMENTS

| 2,426,365 | 8/1947 | Matlock | 192/4 C |
| 2,875,640 | 3/1959 | Huso | 74/483 R |
| 3,169,616 | 2/1965 | Hunsaker et al. | 192/4 C |
| 3,942,614 | 3/1976 | Thompson | 74/483 R |
| 4,096,930 | 6/1978 | Viscardi | 192/4 A |
| 4,187,935 | 2/1980 | O'Hern | 192/4 A |
| 4,232,571 | 11/1980 | Kimberlin | 74/483 R |
| 4,270,624 | 6/1981 | Jessop | 74/483 R |
| 4,572,340 | 2/1986 | Pierce | 192/4 A |
| 4,660,443 | 4/1987 | Simancik | 192/4 A |
| 4,905,802 | 3/1990 | Gotoh | 192/4 A |
| 4,919,242 | 4/1990 | Muramatsu et al. | 192/4 A |

FOREIGN PATENT DOCUMENTS

| 1203756 | 4/1986 | Canada | 192/4 A |
| 246353 | 11/1987 | European Pat. Off. | 180/336 |

OTHER PUBLICATIONS

1985/1986 Nova Shop Manual, General Motors Corporation, 1985, pp. 7A–10. St-373-85/86.
1985/1986 Nova Shop Manual St-373-85/86, FIGS. 7A1-12, 7A-13, General Motors Corporation.

Primary Examiner—Rodney H. Bonck
Assistant Examiner—Andrea Pitts
Attorney, Agent, or Firm—Barnes, Kisselle, Raisch, Choate, Whittemore & Hulbert

[57] ABSTRACT

A shifter brake interlock system for an automatic floor mounted transmission shifter which includes a locking button to be depressed prior to removing the transmission from park position including a cable comprising a strand connected to the brake pedal arm at one end and interconnected to the floor shifter such that the floor shifter is prevented from moving out of park position until the brake is engaged.

4 Claims, 2 Drawing Sheets

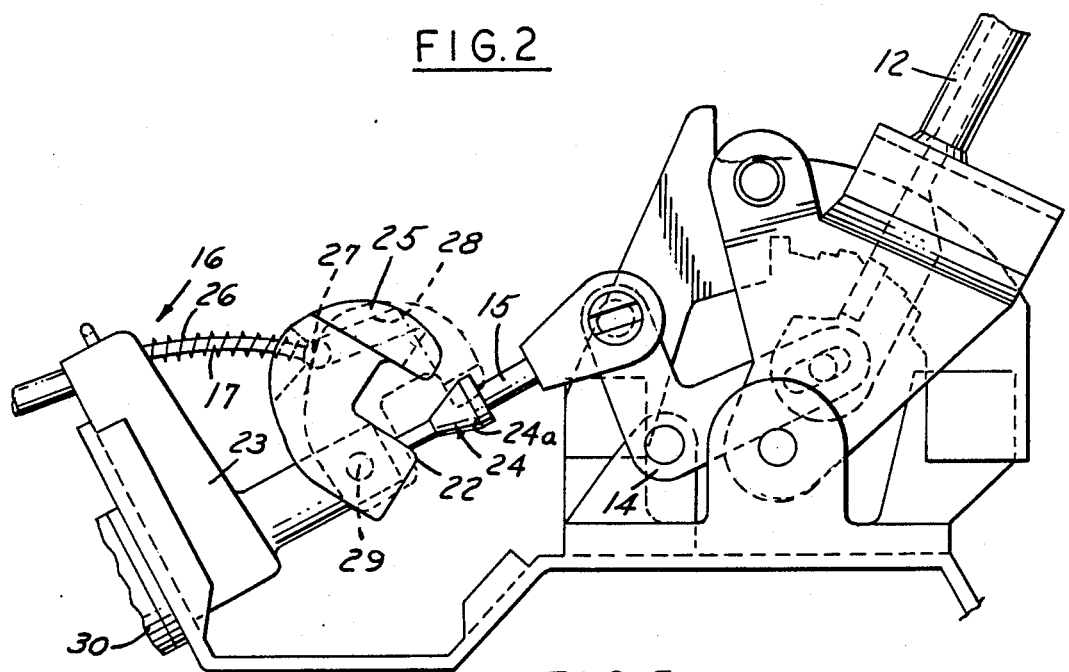
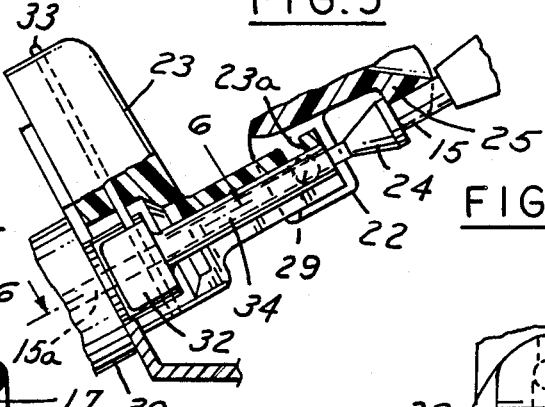
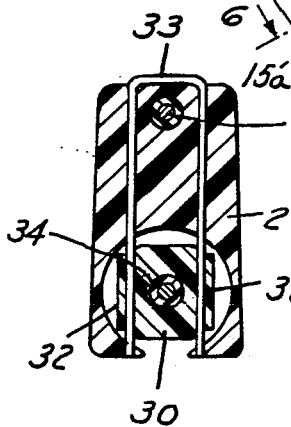
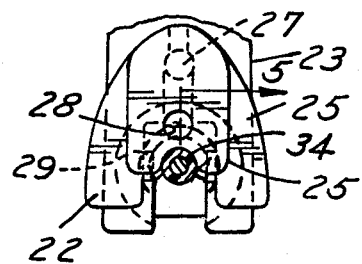
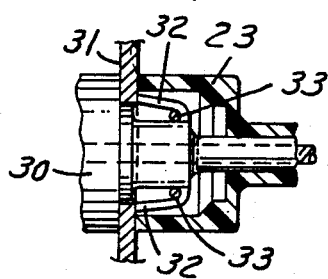

SHIFTER BRAKE INTERLOCK SYSTEM

This invention relates to automatic floor mounted transmission shifters and particularly to an interlock system for preventing shifting of the transmission out of park position until the brake has been engaged.

BACKGROUND AND SUMMARY OF THE INVENTION

One of the problems that sometimes occurs in the operation of automobiles is that it might be possible to shift the automatic floor transmission shifter out of park position at the transmission even though the shift handle has not been moved from the park position. It has been found that in the interest of safety it is preferable that the brake be engaged prior to movement of the transmission shifter out of park position.

Accordingly an objective of the present invention is to provide a shifter brake interlock system which insures that the shifter can only be shifted out of park position when the motor vehicle operator has engaged the brake.

In accordance with the invention, a shifter brake interlock system for an automatic floor mounted transmission shifter which includes a locking button to be depressed prior to removing the transmission from the park position includes a cable comprising a strand connected to the brake pedal arm at one end and interconnected to the floor shifter such that the floor shifter is prevented from moving out of park position until the brake is engaged.

DESCRIPTION OF THE DRAWINGS

FIG. 2 is a partly schematic part sectional view of the system.

FIG. 3 is a sectional view taken along the line 3—3 in FIG. 1.

FIG. 4 is a sectional view taken along the line 4—4 in FIG. 1.

FIG. 5. is a sectional view taken along the line 5—5 in FIG. 4.

FIG. 6 is a sectional view taken along the line 6—6 in FIG. 5.

FIG. 7 is a fragmentary partly schematic view showing the manner in which the system is connected to a brake.

DESCRIPTION

Figure 1:
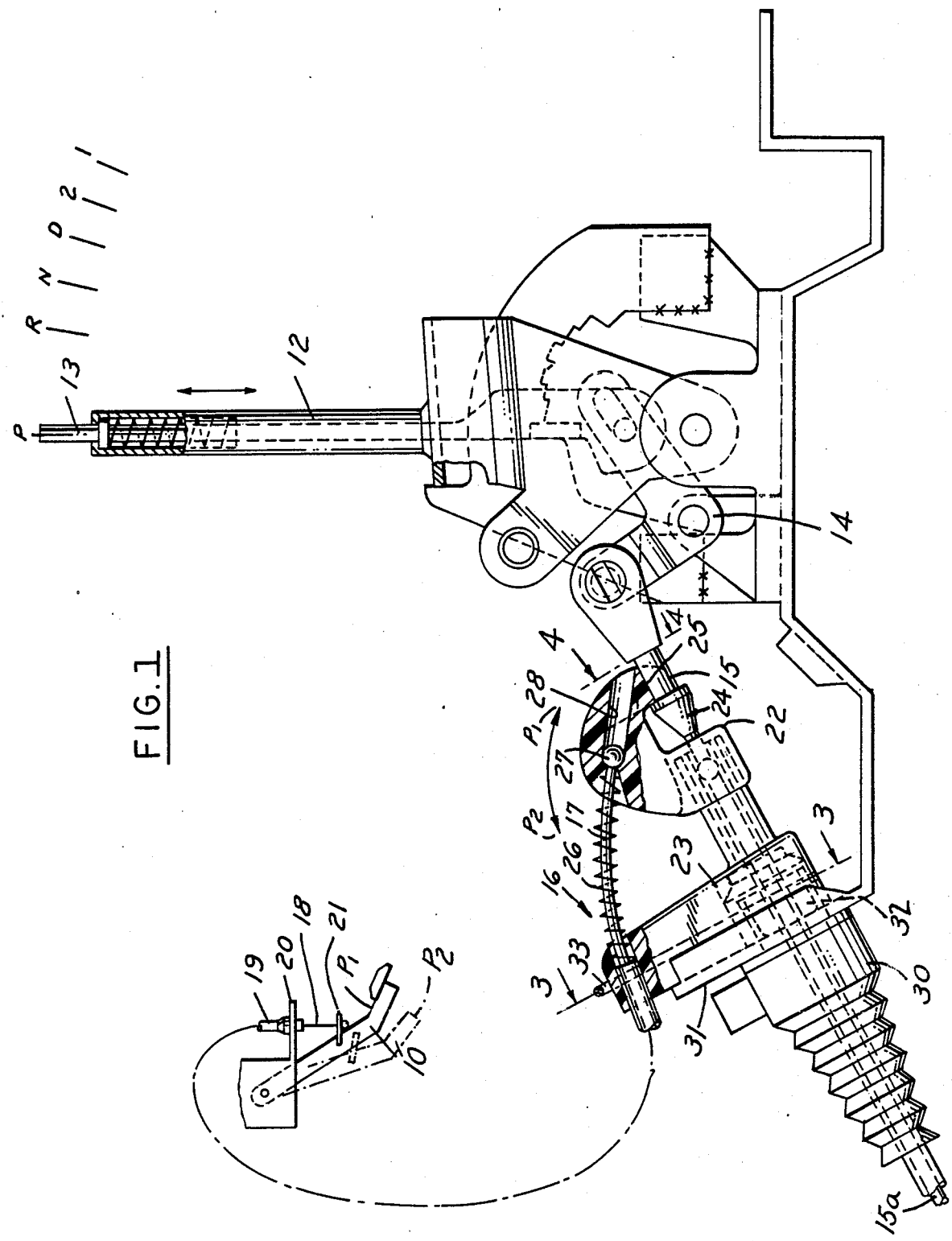
FIG. 1 is a partly schematic view of a shifter brake interlock system embodying the invention.

Referring to FIGS. 1 and 2, the shifter brake interlock system embodying the invention is intended to be utilized with a conventional brake operating lever 10 that is normally foot operated and a floor mounted automatic transmission shifter mechanism 12 that includes a lever that can be shifted in to a plurality of positions including park, reverse, neutral, drive, second gear, and first gear. Such a lever 12 normally includes a finger operated plunger 13 which must be depressed in order to shift the lever 12 out of park position, as is well known in the art. As further shown in FIG. 2, shifting of the lever 12 out of operating position moves a bell crank 14 to translate a rod 15 that is connected to a strand 15a that extends to the transmission.

In accordance with the invention, a cable assembly 16 is provided between the shifter mechanism and functions to prevent shifting of the lever 12 unless the brake pedal lever 10 has been permitted to move and engage the brake.

The cable assembly includes a strand 17 connected at one end as at 18 to the brake lever 10 and extending through a conduit 19 which is fixed between brackets 20 and 21. The other end of the strand 17 is connected to a plastic latch member 22 that is pivoted to a tubular portion of a plastic bracket 23 through which the rod 15 and associated strand 15a extends. The rod 15 includes a stop 24. The latch 22 is generally C shaped and has bifurcated a portion 25 that engages the stop 24 preventing movement of the rod 15 and, in turn, the ball crank 14 by the shifter rod 12 unless the latch 22 is moved out of position. A spring 26 is interposed between the bracket 23 and the enlarged end 27 of the cable 17 to normally urge the latch 22 into engagement with the stop 24. As can be seen the enlarged portion 27 of the strand 17 extends in an opening 28 of the latch for assembly purposes.

As shown in FIG. 4, the end of the latch 25 is bifurcated to form end portions that extend about each side of the rod 15. Referring to FIGS. 3-6, the pivotal connection of the latch 22 to the bracket 23 is achieved bifurcating the end 25 of the latch 22. A connector 30 extends through a mounting bracket 31 and has flexible wings 32 that snap past the opening to retain the connector on the wall 31. The bracket 23 is maintained in assembled relation to the connector by U-shaped metal retainer 33 that extends through opening at bracket 23 and behind the wings 32 (FIG. 6). As shown in FIG. 5, connector 30 includes a tubular portion 34 that surrounds the strand 15a and into which the end of the rod to which the strand 15a is connected extends. Inwardly directed integral pins 29 on latch 22 extend into slots 23a of the tubular portion 34 of the bracket 23 to form the pivotal connection of the latch 22 to the bracket 23.

Referring to FIG. 3 when the brake lever 10 is engaged, it tensions the cable strand 17 moving the latch 25 to the position in FIG. 2 out of engagement with the stop 24 so that the shifter lever 12 is permitted to move and shift the transmission. When the brake lever is released and the transmission is returned to its original position, the latch 25 will move along the frustoconical surface 24a of the stop 24 and once again engage the stop 24 as shown in FIG. 1.

Referring to FIG. 7, the brake lever 10 is connected by a link 40 to the brake mechanism 41.

It can thus be seen that there has been provided a shifter brake interlock system for an automatic floor mounted transmission shifter which includes a locking button to be depressed prior to removing the transmission from park position includes a cable comprising a strand connected to the brake pedal arm at one end and interconnected to the floor shifter such that the floor shifter is prevented from moving out of park position until the brake is engaged.

I claim:

1. In an automobile including a brake including a brake lever and a shifter for an automatic floor mounted transmission having a part position and other positions which includes a locking button to be depressed prior to removing the transmission from park position, said shifter including a linkage means connected at one end to the shifter and connected at to the other end to the transmission, a shifter brake interlock system comprising a latch, a cable comprising a strand connected at one end to the brake lever and connected at the other end to said latch, a stop on said linkage means, said latch being movable into and out of engagement with said stop on said linkage means such that when the shifter is in park position, the latch is in engagement and when the brake lever is engaged, the cable is tensioned moving the latch out of engagement with said stop permitting the shifter to be moved to shift the transmission through said linkage means, said linkage means comprising a rod connected at one end to said shifter, another cable strand connected at one end to said rod and connected at the other end to the transmission, said stop being on said rod, said latch being pivoted and engages said stop on said rod.

2. The shifter brake interlock system set forth in claim 1 including a spring yieldingly urging said latch into engagement with said stop.

3. The shifter brake interlock system set forth in claim 2 wherein said latch has a bifurcated end movable over said rod and engaging said stop.

4. The shifter brake interlock system set forth in claim 3 wherein said stop has a tapered surface such that when the brake is released and the shifter is moved to the park position, the latch will be caused to be cammed into locking engagement with the stop.

* * * * *